US012619414B2

(12) United States Patent
Pavlin

(10) Patent No.: US 12,619,414 B2
(45) Date of Patent: May 5, 2026

(54) ARTIFICIAL INTELLIGENCE-POWERED DIAGRAM-TO-DEPLOYMENT CONVERTER

(71) Applicant: Red Hat, Inc., Raleigh, NC (US)

(72) Inventor: Vaclav Pavlin, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 564 days.

(21) Appl. No.: 16/565,319

(22) Filed: Sep. 9, 2019

(65) Prior Publication Data

US 2021/0075887 A1     Mar. 11, 2021

(51) Int. Cl.
| | |
|---|---|
| *G06F 8/65* | (2018.01) |
| *G06F 8/71* | (2018.01) |
| *G06F 11/07* | (2006.01) |
| *G06F 11/34* | (2006.01) |
| *G06F 11/3698* | (2025.01) |
| *G06N 20/00* | (2019.01) |
| *H04L 67/00* | (2022.01) |

(52) U.S. Cl.
CPC .................. *G06F 8/65* (2013.01); *G06F 8/71* (2013.01); *G06F 11/0793* (2013.01); *G06F 11/3466* (2013.01); *G06F 11/3698* (2025.01); *G06N 20/00* (2019.01); *H04L 67/34* (2013.01)

(58) Field of Classification Search
None
See application file for complete search history.

(56) References Cited

U.S. PATENT DOCUMENTS

| | | | | |
|---|---|---|---|---|
| 10,261,891 | B2 * | 4/2019 | Rajagopalan | .......... G06F 3/0482 |
| 10,657,019 | B1 * | 5/2020 | Chopra | ................... H04L 41/50 |

| | | | | |
|---|---|---|---|---|
| 11,074,091 | B1 * | 7/2021 | Nayakbomman | ....... G06F 9/455 |
| 2018/0088925 | A1 * | 3/2018 | Emeis | .................... G06T 11/206 |
| 2018/0089593 | A1 * | 3/2018 | Patel | ...................... G06N 5/003 |
| 2018/0095730 | A1 * | 4/2018 | Anderson | ........... G06F 11/3006 |
| 2018/0121221 | A1 * | 5/2018 | Ahuja | ...................... H04L 63/02 |
| 2018/0136931 | A1 * | 5/2018 | Hendrich | ................ G06F 11/30 |
| 2018/0159747 | A1 * | 6/2018 | Chang | ................. H04L 41/5045 |
| 2018/0165604 | A1 * | 6/2018 | Minkin | .................. G06N 5/022 |
| 2018/0189494 | A1 * | 7/2018 | Ahuja | .................... G06F 21/50 |
| 2018/0198845 | A1 * | 7/2018 | Kulp | ......................... G06F 9/54 |

(Continued)

OTHER PUBLICATIONS

Mallesh Murugesan, "Deploy AI Models as Microservice", in AI, Machine Learning, NLP, Feb. 12, 2019, 4 pages.

(Continued)

*Primary Examiner* — Chirag G Shah
*Assistant Examiner* — Suk Jin Kang
(74) *Attorney, Agent, or Firm* — Womble Bond Dickinson (US) LLP

(57)     ABSTRACT

A method includes receiving architecture instructions for a plurality of microservices, the architecture instructions comprising one or more design parameters for one or more of the plurality of microservices. The method also includes generating, by a processing device, in view of a machine learning model, a deployment configuration for the architecture instructions, wherein the deployment configuration comprises one or more deployment parameters in view of the one or more design parameters. The method also includes receiving an update to the deployment configuration. The method also includes response to receiving the update, modifying the architecture instructions to reflect the update to the deployment configuration.

20 Claims, 6 Drawing Sheets

(56) References Cited

U.S. PATENT DOCUMENTS

| | | | | |
|---|---|---|---|---|
| 2018/0309630 | A1* | 10/2018 | Zhao | H04L 67/52 |
| 2018/0316568 | A1* | 11/2018 | Gill | H04L 43/20 |
| 2018/0349121 | A1* | 12/2018 | Bagarolo | H04L 67/10 |
| 2019/0036869 | A1* | 1/2019 | Jana | H04L 41/5025 |
| 2019/0042290 | A1* | 2/2019 | Bailey | G06F 8/51 |
| 2019/0087835 | A1* | 3/2019 | Schwed | H04L 63/0421 |
| 2019/0095599 | A1* | 3/2019 | Iliofotou | G06F 21/316 |
| 2019/0102155 | A1* | 4/2019 | Garvey | G06F 8/65 |
| 2019/0171447 | A1* | 6/2019 | Lepcha | G06F 9/28 |
| 2019/0171948 | A1* | 6/2019 | Pillai | G06N 20/00 |
| 2019/0173940 | A1* | 6/2019 | Bagarolo | G06F 11/302 |
| 2019/0220289 | A1* | 7/2019 | Driesen | G06F 9/44505 |
| 2019/0250912 | A1* | 8/2019 | Gavisiddappa Kodigenahalli | G06F 8/20 |
| 2019/0258465 | A1* | 8/2019 | De Capoa | G06F 8/64 |
| 2019/0272205 | A1* | 9/2019 | Jiang | G06F 9/547 |
| 2019/0311301 | A1* | 10/2019 | Pyati | G06Q 30/0202 |
| 2019/0317776 | A1* | 10/2019 | Walsh | G06N 20/00 |
| 2019/0325353 | A1* | 10/2019 | Aftab | G06N 20/00 |
| 2019/0340059 | A1* | 11/2019 | Bagarolo | G06F 8/71 |
| 2019/0356555 | A1* | 11/2019 | Bai | H04L 41/142 |
| 2020/0004668 | A1* | 1/2020 | Dwivedi | G06F 11/0718 |
| 2020/0034750 | A1* | 1/2020 | Ritter | G06N 20/00 |
| 2020/0042328 | A1* | 2/2020 | Gupta | H04L 67/34 |
| 2020/0112490 | A1* | 4/2020 | Mopur | G06N 20/00 |
| 2020/0112604 | A1* | 4/2020 | Kulp | H04L 67/141 |
| 2020/0142675 | A1* | 5/2020 | Jaeger | G06F 8/427 |
| 2020/0193221 | A1* | 6/2020 | Aftab | G06K 9/6253 |
| 2020/0264902 | A1* | 8/2020 | Driesen | G06F 8/36 |
| 2020/0329108 | A1* | 10/2020 | Tomita | G06F 8/658 |
| 2020/0341876 | A1* | 10/2020 | Gandhi | G06F 11/3668 |
| 2020/0348921 | A1* | 11/2020 | Maréchal | G06F 8/65 |
| 2020/0366580 | A1* | 11/2020 | Sinha | H04L 43/0823 |
| 2020/0382968 | A1* | 12/2020 | Gupta | H04W 24/02 |
| 2020/0396140 | A1* | 12/2020 | Bhatia | H04L 41/5045 |
| 2020/0396225 | A1* | 12/2020 | Bhatia | H04L 63/102 |
| 2020/0401457 | A1* | 12/2020 | Singhal | G06F 9/445 |
| 2020/0402084 | A1* | 12/2020 | Briancon | G06F 8/315 |
| 2021/0021643 | A1* | 1/2021 | Nakagoe | H04L 67/34 |
| 2021/0027136 | A1* | 1/2021 | Hwang | G06K 9/627 |
| 2021/0042105 | A1* | 2/2021 | Jones | G06F 9/445 |
| 2021/0064360 | A1* | 3/2021 | Moser | G06F 9/44536 |
| 2021/0072965 | A1* | 3/2021 | Masters | G06F 9/44505 |
| 2021/0089410 | A1* | 3/2021 | Natanzon | G06F 16/27 |
| 2021/0248514 | A1* | 8/2021 | Cella | G06Q 30/0208 |
| 2021/0271460 | A1* | 9/2021 | Jaeger | G06F 8/4441 |
| 2021/0274361 | A1* | 9/2021 | Gupta | H04W 24/02 |
| 2021/0320982 | A1* | 10/2021 | White | G06F 11/3476 |
| 2021/0342165 | A1* | 11/2021 | Ferrell | H04L 41/044 |
| 2022/0004662 | A1* | 1/2022 | Schwed | G06F 21/6218 |
| 2023/0017701 | A1* | 1/2023 | Mopur | H04L 41/0816 |

OTHER PUBLICATIONS

Ted Dunning, "Deploying Machine Learning and AI in the Real World Using Rendezvous Architecture", Deploying Machine Learning and AI in the Real World Using Rendezvous Architecture—DZone AI, Opinion, May 30, 2018, 15 pages.

* cited by examiner

100

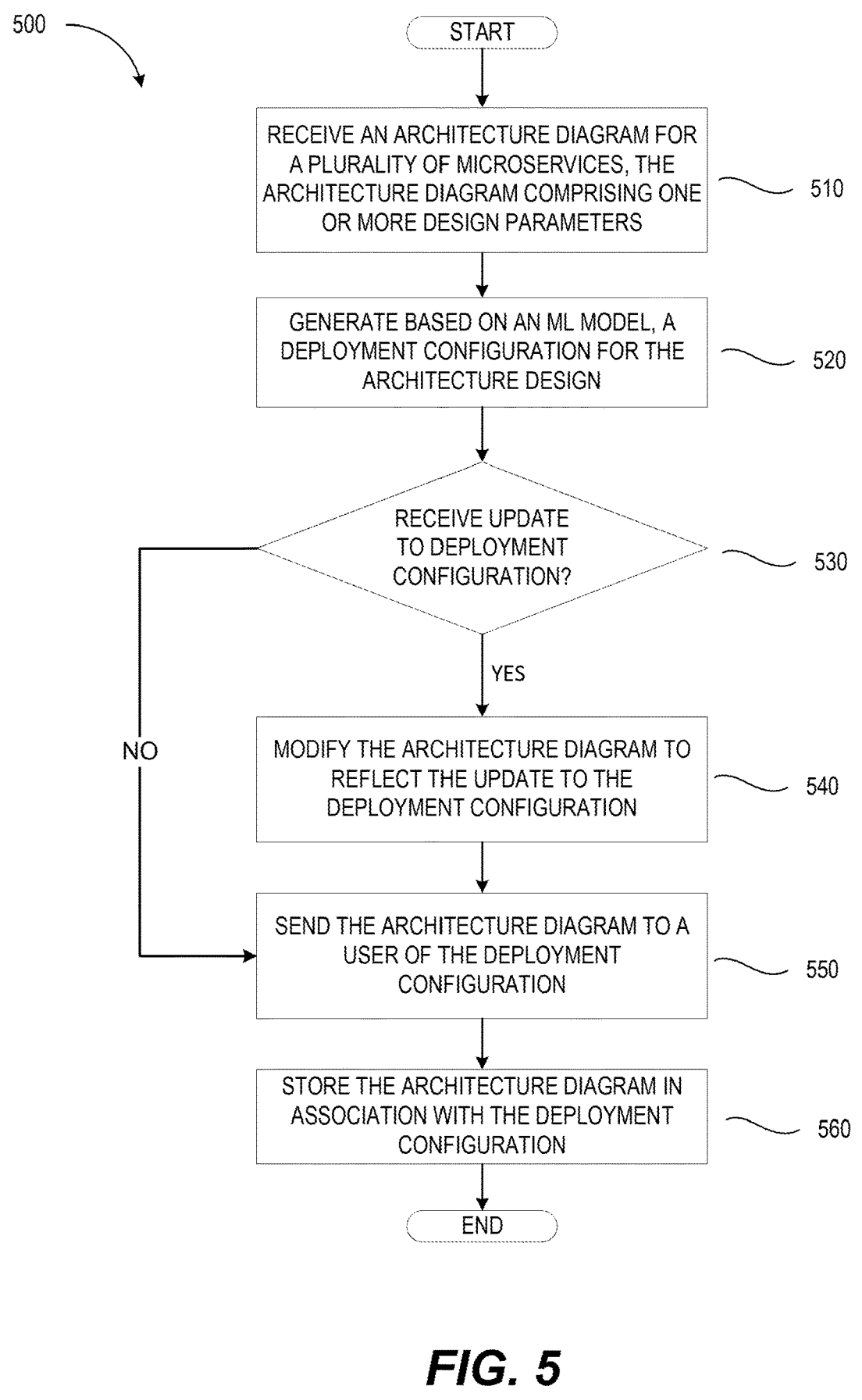

500

START

RECEIVE AN ARCHITECTURE DIAGRAM FOR A PLURALITY OF MICROSERVICES, THE ARCHITECTURE DIAGRAM COMPRISING ONE OR MORE DESIGN PARAMETERS — 510

GENERATE BASED ON AN ML MODEL, A DEPLOYMENT CONFIGURATION FOR THE ARCHITECTURE DESIGN — 520

RECEIVE UPDATE TO DEPLOYMENT CONFIGURATION? — 530

NO

YES

MODIFY THE ARCHITECTURE DIAGRAM TO REFLECT THE UPDATE TO THE DEPLOYMENT CONFIGURATION — 540

SEND THE ARCHITECTURE DIAGRAM TO A USER OF THE DEPLOYMENT CONFIGURATION — 550

STORE THE ARCHITECTURE DIAGRAM IN ASSOCIATION WITH THE DEPLOYMENT CONFIGURATION — 560

END

*FIG. 5*

ARTIFICIAL INTELLIGENCE-POWERED DIAGRAM-TO-DEPLOYMENT CONVERTER

TECHNICAL FIELD

Aspects of the present disclosure relate to microservices.

BACKGROUND

Microservices are used to build online applications. A microservice architecture is an architectural style that structures an online application as a collection of services that are independent, distributed, and loosely coupled. Each microservice in a microservice system is organized around a single business capability. For example, an e-commerce website may have several microservices, including a microservice for payments, a microservice for user accounts, and a microservice for shipping product sold on the website, among others. The microservice architecture enables the continuous delivery and deployment of large applications. This allows an online business to continuously update its software in a piecemeal fashion—one microservice may be updated without affecting the other microservices. By contrast, a monolithic architecture is a single-tiered software application in which all the pieces of the application are combined into a single program from a single platform.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 is a flow diagram that illustrates an example method for converting an architecture diagram of a microservice system to a deployment configuration for the microservice system.

DETAILED DESCRIPTION

Figure 1:
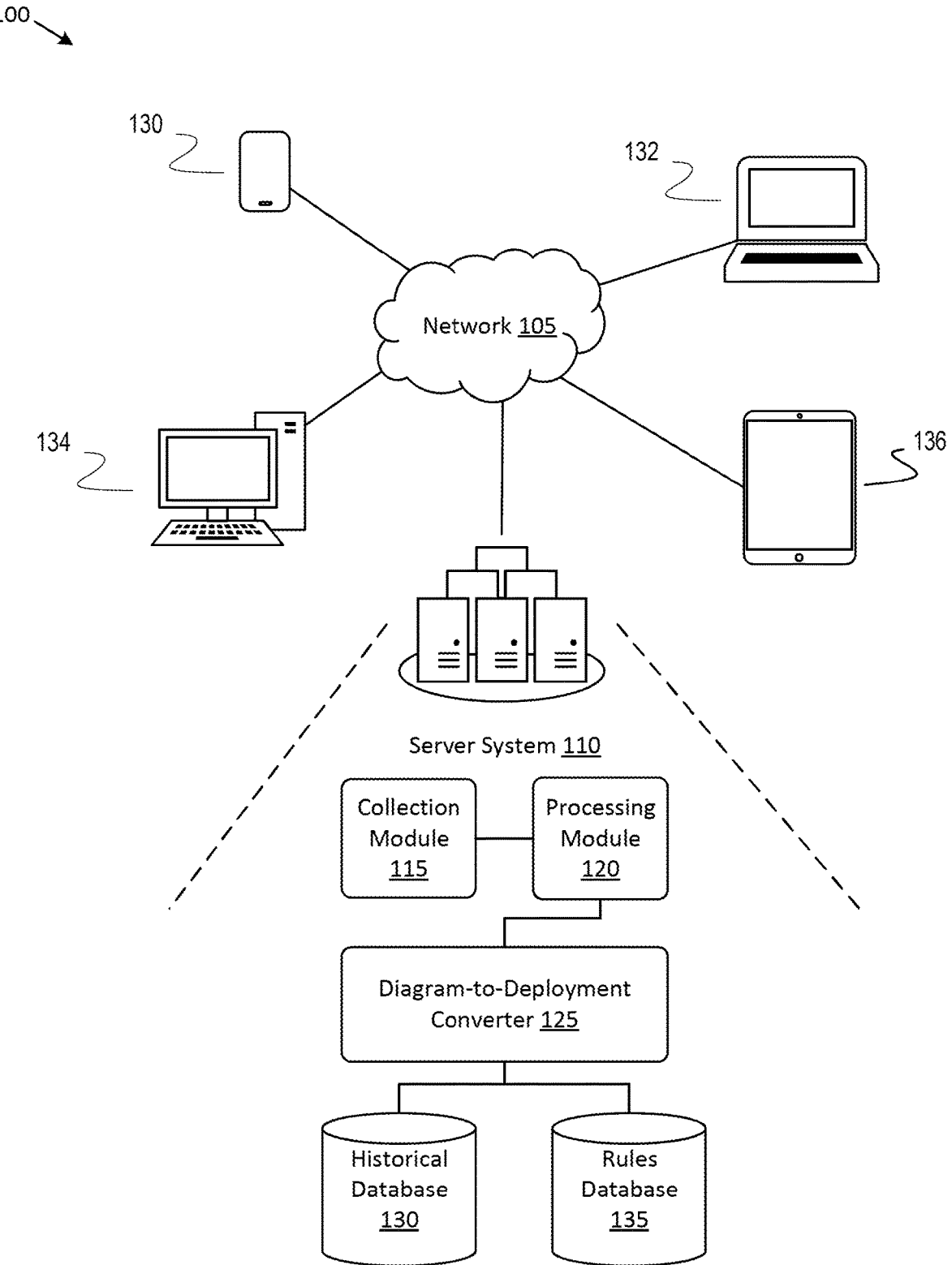
FIG. 1 is a block diagram that illustrates an example network environment for an example diagram-to-deployment converter for a system of microservices, in accordance with some embodiments of the present disclosure.

A microservice system separates an application into its core functions. Each function may be known as a service or microservice. Each microservice may be built and deployed independently, meaning individual services can function and fail without negatively affecting other services. For example, the search function on an e-commerce website may be its own microservice, and a recommended products section on the same e-commerce website may also be its own independent microservice. Either of these services can fail, be maintained, or be updated without affecting the other service.

A microservice system may be beneficial because individual services may be re-used in other applications with relatively minor updates. An entity using microservices may have several prepared microservice components. For example, an entity may have a microservice for storing user information in a database that may be used in several different applications. These prepared components may save significant programming time because a programmer need not re-write the code for a particular business need; she may simply use the prepared component. This has its own drawbacks, however. Often the prepared microservices do not fit together easily, and a programmer or programming team may find it difficult to build an application using several prepared microservices.

When preparing to deploy a software application composed of multiple microservices (referred to herein as a microservice system), a programmer may create an architecture diagram of the microservice system. An architecture diagram may be a high-level diagram indicating the microservices to be used and a small number of other design parameters such as a programming language to be used, an indication of which microservices in the microservice system need access to their own storage databases, or whether the microservices will need to access any third-party entities or application program interfaces (API), among other things. Another example of a design parameter may be a version of the microservice architecture. The architecture diagram is a good place to start, but often lacks all the information required for full deployment of the application. Generally, a microservice team (consisting of one or more software programmers) begins with a microservice architecture diagram and then performs several manual steps to take the software application from the diagram stage to actual deployment of the microservice system. Deployment of the microservice system may be understood to mean that the microservice system is running properly and providing services to users. For example, a deployed e-commerce microservice system allows users to purchase products on its website.

Manually taking an application from diagram stage (e.g., the architecture diagram) to deployment is cumbersome, expensive, and bug-prone for at least two reasons: (1) it is often unclear how to efficiently deploy the architecture diagram, and (2) updates to the microservice system are generally not documented or shared among programmers. This makes it difficult for a microservice system to be handed off from one team to another.

To overcome the above discussed challenges, a diagram-to-deployment converter may take a microservice architecture diagram and automatically generate a deployment configuration using a machine learning model. The machine learning model may take as input the microservice architecture diagram along with some design parameters. It may output the deployment configuration. The deployment configuration may include one or more deployment parameters. The deployment parameters may include substantially all the information a microservice team needs to successfully deploy the application using the microservice system. This information may include communication protocols, input/output (I/O) ports or interfaces, a specification for storage type and size for each microservice, or any other suitable information. In addition to generating the deployment configuration, the diagram-to-deployment converter can also work in reverse: if the deployment configuration is altered or updated in any way, the diagram-to-deployment converter may detect this and update the architecture diagram accordingly. This way the architecture diagram may accurately represent its corresponding deployment configuration.

In particular embodiments, a method for converting an architecture diagram of a microservice system to a deployment configuration for the microservice system includes receiving an architecture diagram for multiple microservices, where the architecture diagram includes one or more design parameters for the microservices. The method also includes generating, by a computer processing device, based on a machine-learning model, a deployment configuration for the architecture diagram, wherein the deployment configuration includes one or more deployment parameters based on the one or more design parameters. The method also includes receiving an update to the deployment configuration. The method also includes response to receiving the update, modifying the architecture diagram to reflect the update to the deployment configuration.

FIG. 1 is a block diagram that illustrates an example network environment 100 for an example diagram-to-deployment converter for a system of microservices, in accordance with some embodiments of the present disclosure. A server system 110 provides functionality for collecting and processing data from client devices 130-136. The server system 110 includes software components that can be deployed at one or more data centers in one or more geographic locations, for example. The server system 110 may be, include, or use a microservice system, such as the microservice systems illustrated in FIGS. 2 and 4. The server system 112 software components can include a collection module 115, a processing module 120, a diagram-to-deployment converter 125, a historical database 130 and a rules database 135. The software components can include subcomponents that can execute on the same or on different individual data processing apparatus.

An application, such as a web-based application, can be provided as an end-user application to allow users to interact with the server system 110. The client application or components thereof can be accessed through a network 105 (e.g., the Internet) by users of client devices, such as a smart phone 130, a laptop computer 132, a personal computer 134, and a tablet computer 136. Other client devices are possible. Additionally or alternatively, software components for the network environment 100 (e.g., the collection module 115, the processing module 120, the diagram-to-deployment converter 125) or any portions thereof can reside on or be used to perform operations on one or more client devices.

The collection module 115 may receive data from client devices 130-136. The data may include architecture diagrams for microservice systems. The architecture diagrams may be visual diagrams drawn in any suitable format (e.g., CAD schematic, VISIO, POWERPOINT, hand-drawn). The architecture diagrams may or may not include other design parameters. Design parameters may be information about the architecture diagram associated with the architecture diagram. Design parameters may include more high-level or general information than the deployment parameters, which is discussed herein. Examples of design parameters include a programming language to be used in the deployment of the microservice system, a description of each microservice, a business purpose for each microservice or the entire microservice system, an indication of which microservices in the microservice system need access to their own storage databases, and whether the microservices will need to access any third-party entities or application program interfaces (API), among other things.

Another example of a design parameter may be a version of the microservice architecture. As the microservice architecture is updated either manually or automatically, a new version of the microservice architecture may be generated (e.g., the versions may be tracked in metadata). The diagram-to-deployment converter 125 may generate a new deployment reflecting the new version. As an example, if a microservice team updates the microservice architecture in any way, the diagram-to-deployment converter 125 may record the update as a new version of the architecture diagram and may also generate a new deployment configuration to reflect the update, as discussed herein. The diagram-to-deployment converter 125 may also keep a record of all the versions in case any member of the microservices team or any other interested party wishes to view past versions. For example, if another user is working on an older deployment configuration, the diagram-to-deployment converter may detect this and may send the user the corresponding architecture diagram.

Similarly, if a user updates the deployment configuration once it has already been generated and deployed, a new version of the deployment may be generated and recorded by the diagram-to-deployment converter 125. This may operate similarly to how versions of the architecture diagram are recorded, as discussed above. The diagram-to-deployment converter 125 may also update the architecture diagram in response to the update to the deployment configuration, as discussed herein. As an example, if a microservice team updates the deployment configuration in any way, the diagram-to-deployment converter 125 may record the update as a new version of the deployment configuration and may also generate an update to the architecture diagram to reflect the update that was made to the deployment configuration, as discussed herein. The diagram-to-deployment converter 125 may also keep a record of all the versions in case any member of the microservices team or any other interested party wishes to view past versions. For example, if another user is working form an older architecture diagram, the diagram-to-deployment converter may detect this and may send the user the corresponding deployment configuration.

Processing module 120 may process the data collected by collection module 115 to prepare the data to be used as input for the diagram-to-deployment converter 125. The processing performed by processing module 120 may be any suitable processing to prepare the data. This may include stripping the data of unnecessary information, re-formatting the data, or any other suitable action. For example, the data collected by collection module 115 may be a diagram that looks similar to the microservice architecture 400 of FIG. 4. The processing module 120 may take this data and determine that there are four microservices: storefront webapp 410, account service 420, inventory service 430, and shipping service 440. It may also determine that three of those services are connected to databases 421, 431, 441. It may also determine, from the mobile device 130 and the laptop computer 132, that inputs are coming from both desktop computers and mobile devices. The processing module 120 may format this information in a way that it can be used as input for the diagram-to-deployment converter 125. For example, the above information may be input as a table of information with appropriate labels. In particular embodiments, processing module 120 may be located in the diagram-to-deployment converter 125, or may be combined with collection module 115, or both processing module 120 and collection module 115 may be located within the diagram-to-deployment converter 125.

In particular embodiments, the diagram-to-deployment converter 125 may additionally run a test of the architecture diagram, the deployment configuration, or both. This may involve determining whether an update to one microservice will cause another microservice to fail. If that is the case, the diagram-to-deployment converter 125 may generate an alert for one or more users of the deployment configuration, may solve the problem automatically by updating the deployment configuration to include the proper components, or both. The alert may be to alert a user that the update negatively affects the performance associated with one or more of the plurality of microservices. The alert may also include one or more suggested remedies to correct the performance associated with one or more of the plurality of microservices. The suggested remedies may be any suitable remedies, including adding memory to the system, correcting code, re-routing one or more communication pathways, or any other suitable update.

The diagram-to-deployment converter 125 may convert a received architecture diagram into a deployment configuration. It may use a machine-learning model to make this conversion. The machine-learning model may use any suitable machine-learning algorithm to make the conversion, including a logistic regression algorithm, a decision tree, a support vector machine, a Bayes-based algorithm, a k-Nearest Neighbors algorithm, a K-Means algorithm, a random forest algorithm, or any other suitable algorithm. The machine-learning model may be trained training data which may include input data attributes that include past architecture diagrams, design parameters, or attributes extracted from past architecture diagrams. For example, attributes extracted from an architecture diagram may include a number of microservices, a purpose of each microservice, a programming language, a number and type of storage containers, or any other suitable attribute. The training data may also include answers for the extracted attributes. The answers may be appropriate deployment configurations, given the particular architecture design, design parameters, and extracted attributes. The deployment configuration may include one or more deployment parameters. The deployment parameters may include substantially all the information a microservice team needs to successfully deploy the application using the microservice system. This information may include communication protocols, input/output (I/O) ports or interfaces, a specification for storage type and size for each microservice, or any other suitable information. The diagram-to-deployment converter 125 may access historical database 130 during training or afterwards to access past architecture diagrams and their associated deployment configurations. The diagram-to-deployment converter may, in addition to relying on the machine-learning model, use one or more rules stored in rules database 135 to generate the deployment configuration. This may be because some aspects of an architecture design or design parameter may be associated with a rule that is to be used when generating the deployment configuration. For example, there may be a rule in rules database that says if the architecture diagram specifies using a particular programming language, then a memory of a particular size needs to be used. These rules may enable the efficient generation of deployment configurations.

Figure 2:
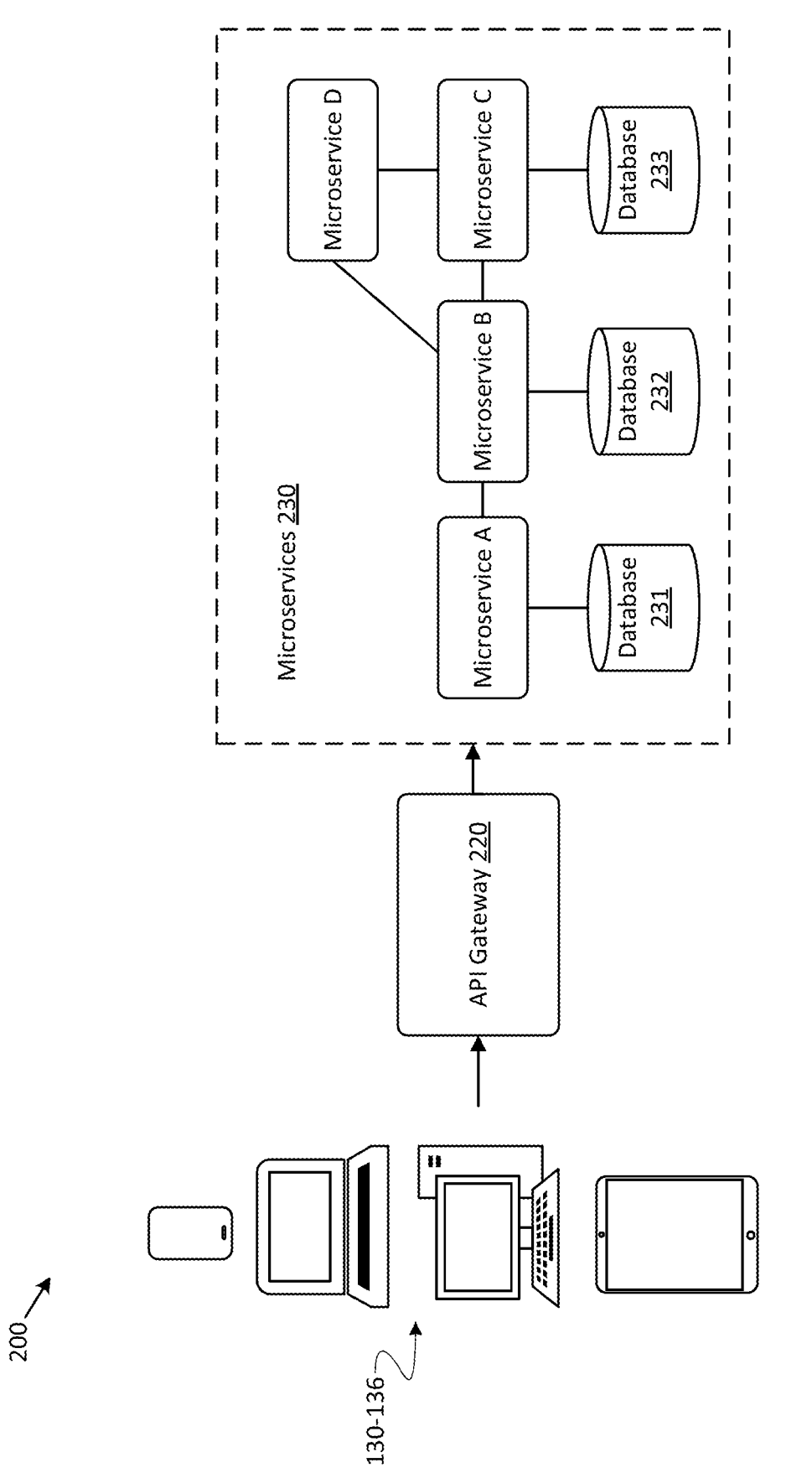
FIG. 2 is a block diagram that illustrates an example microservice architecture, in accordance with some embodiments of the present disclosure.

FIG. 2 is a block diagram that illustrates an example microservice architecture 200, in accordance with some embodiments of the present disclosure. As mentioned above, a microservice system separates an application into its core functions. Each function may be known as a service or microservice. Each microservice may be built and deployed independently, meaning individual services can function and fail without negatively affecting other services. The microservice architecture 200 may represent a microservice system that uses four different microservices A-D, three different databases 231, 232, 233, an API gateway 220, and interfaces with client devices 130-136. The API gateway 220 may be software that is "placed" in front of the application programming interface and acts as a single point of entry for the group of microservices A-D. The API gateway 220 may allow the microservice teams to structure their respective microservices in different ways. Each time a new microservice is added to the microservice system, the API gateway 220 may need to be updated to reflect the new microservice. This update to API gateway 220 may be done automatically by the diagram-to-deployment converter 125. For example, when a new microservice is added, the diagram-to-deployment converter 125 may detect this and may update the API gateway 220 in the deployment configuration or in the architecture diagram, or both.

Generally, a separate engineering or design team is responsible for each microservice. Each team may have its own deployment cadence and practices. For example, the team responsible for microservice A of microservices 230 may update the microservice every week, whereas the team responsible for microservice B may update the microservice every two weeks. Microservice A and Microservice B may communicate with each other, so when one of them is updated, it may affect the communication with the other. Time must be spent identifying dependencies between the different services. For example, building one microservice may trigger other microservices needing to be built. These are things that the diagram-to-deployment converter 125 may be able to detect and account for during the generation of the deployment configuration or the update to the architecture diagram. For example, the diagram-to-deployment converter 125 may be able to identify dependencies between two or more microservices. This may mean that when a change to one microservice requires updates to one or more other microservices, the diagram-to-deployment converter 125 may identify which other microservices need updates. It may make this identification using the machine-learning model discussed herein, using past updates as feature variables and dependencies as labels for the feature variables as the training data.

Figure 3:
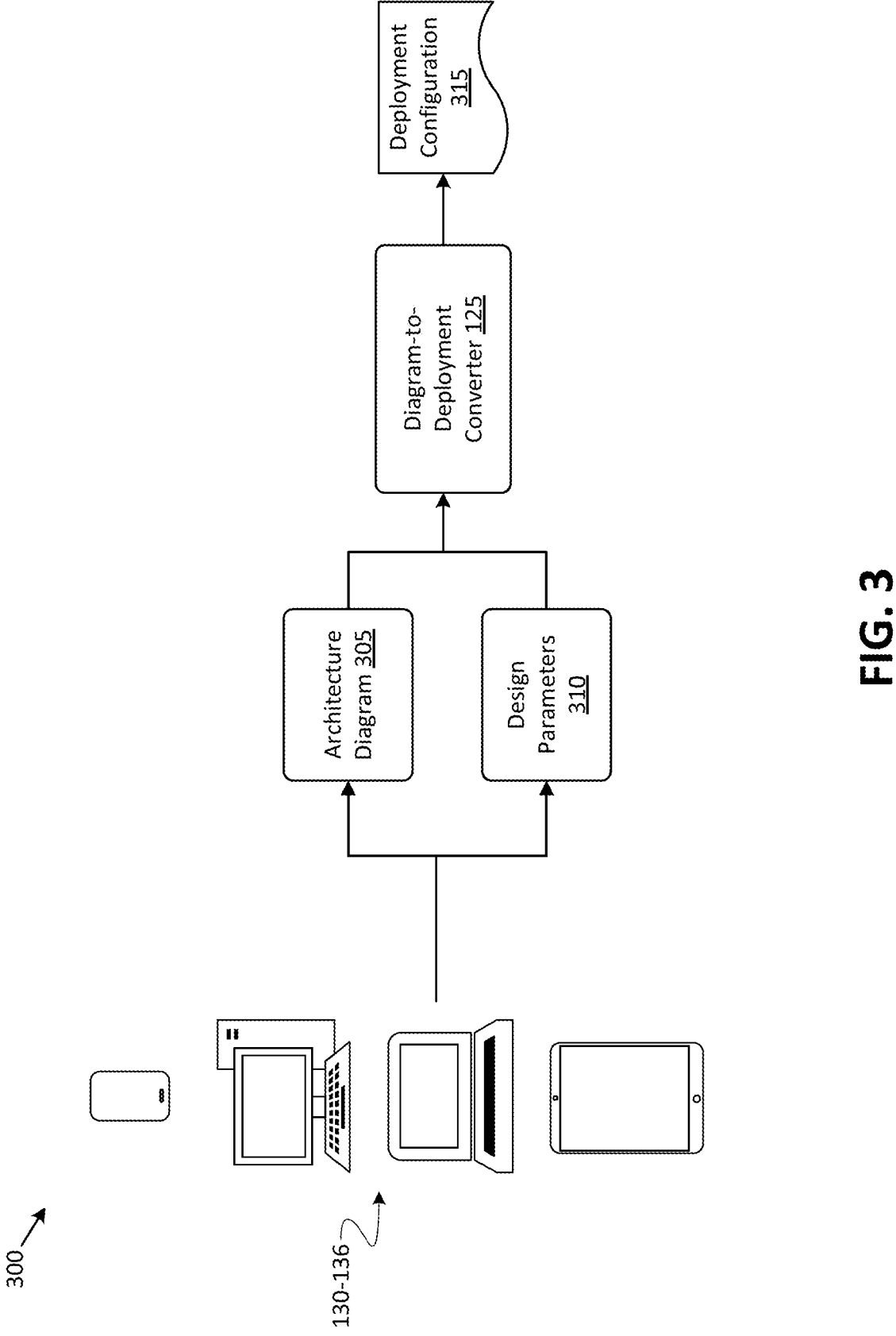
FIG. 3 is a flow diagram of a method for converting an architecture diagram of a microservice system to a microservice deployment configuration, in accordance with some embodiments of the present disclosure.

FIG. 3 is a flow diagram 300 of a method for converting an architecture diagram of a microservice system to a microservice deployment configuration, in accordance with some embodiments of the present disclosure. A team of one or more programmers may submit the architecture diagram 305 along with one or more other design parameters 310 from client devices 130-136. The architecture diagram 305 may be a high-level diagram indicating, in visual form, the microservices to be used in the microservice system. The architecture diagram 305 may also indicate which microservices communicate with each other, which microservices access memory, a purpose for each microservice, and any other suitable information. In addition to the architecture diagram 305, design parameters 310 may also be sent by client devices 130-136. a small number of other design parameters such as a programming language to be used, an indication of which microservices in the microservice system need access to their own storage databases, and whether the microservices will need to access any third-party entities or application program interfaces (API), among other things.

Design parameters 310 may be information about the architecture diagram associated with the architecture diagram. Design parameters may include more high-level or general information than the deployment parameters, which is discussed herein. Examples of design parameters include a programming language to be used in the deployment of the microservice system, a description of each microservice, a business purpose for each microservice or the entire microservice system, an indication of which microservices in the microservice system need access to their own storage databases, and whether the microservices will need to access any third-party entities or application program interfaces (API), among other things. In particular embodiments, architecture diagram 305 and design parameters 310 may be sent by client devices 130-136 as a single package. For example, the design parameters 310 may be sent as comments or as metadata along with the architecture diagram 305.

In particular embodiments, diagram-to-deployment converter 125 may take as input the architecture diagram 305 (before or after being processed by processing module 120 (not illustrated in FIG. 3)) and design parameters 310. The diagram-to-deployment converter 125 may then use the machine-learning model as discussed herein to generate a deployment configuration 315. The deployment configuration may include one or more deployment parameters. The deployment parameters may include substantially all the information a microservice team needs to successfully deploy the application using the microservice system. This information may include communication protocols, input/output (I/O) ports or interfaces, a specification for storage type and size for each microservice, or any other suitable information. This information may be in the form of a example microservice architecture diagram 400 may also specify that account service 420 accesses account database 421, inventory service 430 accesses inventory database 431, and shipping service 440 accesses shipping database 441. This architecture diagram may be collected by collection module 115 and processed by processing module 120. The processing may be extracting design parameters from the example microservice architecture diagram 400. For example, the processing module 120 may extract a number of microservices from the example microservice architecture diagram 400 (e.g., four microservices). The processing module 120 may extract information about which microservices communicate with each other (e.g., storefront webapp 410 communicates with account service 420, inventory service 430, and shipping service 440). The processing module may extract information about the purpose of each microservice and assign it to a category. For example, account service 420 may have the purpose of storing and maintaining user accounts. It may be assigned to a "user account" category. As another example, the processing module may extract information about which services need to access storage devices (e.g., account service 420, inventory service 430, and shipping service 440). Any other suitable information may also be extracted from the example microservice architecture diagram 400.

The diagram-to-deployment converter 125 may accept as input the extracted information from the example microservice architecture diagram 400. The input may take any suitable form. As an example and not by way of limitation, the input may come in the form of a vector that includes several vector spaces that are each filled with a classification. For example, consider the following multi-dimensional vector:

TABLE 1

| | | Example Input for Diagram-to-Deployment Converter | | | |
|---|---|---|---|---|---|
| | Purpose | Communicates with? | Accesses memory? | Programming language | Frontend or backend? |
| Service 1 | <Storefront> | <2>, <3>, <4> | <no> | <javascript> | <frontend> |
| Service 2 | <User accounts> | <1> | <yes> | <C++> | <backend> |
| Service 3 | <Inventory> | <1> | <yes> | <python> | <backend> |
| Service 4 | <Shipping> | <1> | <yes> | <java> | <backend> | document, a computer program, a visual representation, an interactive diagram, or any other suitable form.

Figure 4:
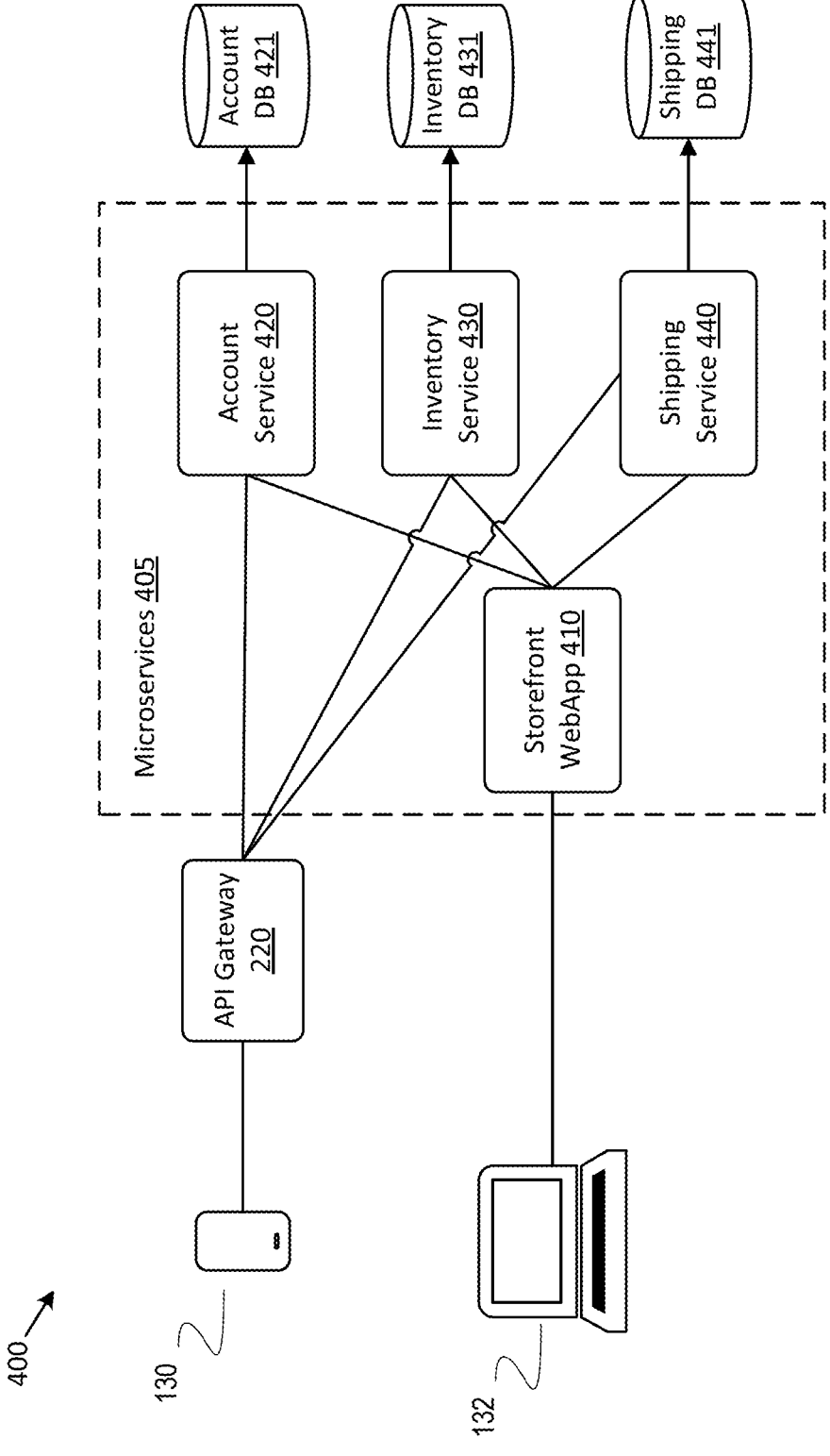
FIG. 4 is a block diagram that illustrates an example microservice architecture for an e-commerce website.

FIG. 4 is a block diagram that illustrates an example microservice architecture diagram 400 for an e-commerce website. Example microservice architecture diagram 400 will now be discussed in the context of an example architecture diagram that is converted into a deployment configuration by diagram-to-deployment converter 125 and associated modules. Example microservice architecture diagram 400 may be an example of what architecture diagram 305 looks like when it is sent to the diagram-to-deployment converter 125. Example microservice architecture diagram 400 may be designed for an e-commerce web application that takes orders from customers, verifies inventory, and ships products. The application may consist of several services, including a storefront user interface along with some backend services for checking inventory, storing customer accounts, and shipping products that customers have ordered. The architecture diagram may reflect these services with the following microservices 405 represented as design components: storefront webapp 410, account service 420, inventory service 430, and shipping service 440. The The diagram-to-deployment converter 125 may accept the above table as input. Note that the above table is an example only, the column titles are examples only, and the entries are examples only. This disclosure contemplates any suitable input with any suitable entries. For example, instead of "<yes>" and "<no>" entries, the entries may be "<1>" and "<0>". In particular embodiments, the information in the above table may be considered to be design parameters. The diagram-to-deployment converter 125 may input this information into the machine-learning model that has previously been trained. The trained machine-learning model may output a deployment configuration that corresponds to the inputted information from the architecture diagram. The deployment configuration may include one or more deployment parameters. The deployment parameters may include substantially all the information a microservice team needs to successfully deploy the application using the microservice system. This information may include communication protocols, input/output (I/O) ports or interfaces, a specification for storage type and size for each microservice, or any other suitable information.

FIG. 5 is a flow diagram that illustrates an example method 500 for converting an architecture diagram of a microservice system to a deployment configuration for the microservice system. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. The method 500 may begin at step 510, where the processing logic receives an architecture diagram for a plurality of microservices. The architecture diagram may include one or more design parameters for one or more of the plurality of microservices, as discussed herein. At step 520, the processing logic may generate based on a machine-learning model, a deployment configuration for the architecture diagram, as discussed herein. The deployment configuration may include one or more deployment parameters based on the one or more design parameters, as discussed herein.

At step 530, the processing logic checks to determine whether an update to the deployment configuration has been received. At times, a microservice team may make updates to the deployment configuration or to the services within the microservice system. The diagram-to-deployment converter 125 or any other suitable processing logic may periodically check to see if any updates have been made. These updates may be structured and fed into the diagram-to-deployment converter 125. The diagram-to-deployment converter 125 may then operate in reverse: if the updates to the deployment configuration warrant any changes to the architecture diagram, the diagram-to-deployment converter 125 may proceed to step 540, where the processing logic modifies the architecture diagram to reflect the update to the deployment configuration or to the services themselves. For example, the microservice team may add an additional microservice to the deployment configuration. In the example of FIG. 4, this new microservice may be a recommendation microservice that recommends products to users in a sidebar of the user interface. The diagram-to-deployment converter 125 may detect this and consequently output an update to the associated architecture diagram. The update may include any suitable number of new or modified design parameters. This way, anyone who works on this particular microservice system may have access to a substantially fully updated architecture diagram and deployment configuration. The update to the deployment configuration may be any suitable update, including an addition of a new microservice, an addition of a new programming language to the deployment configuration, a change in a size of a memory storage device, a change to a number of input/output ports in one or more components.

At step 550, the processing logic may send the architecture diagram, the deployment configuration, or both to a user of the deployment configuration. This user may be a member of the microservice team for this particular microservice system. At step 560, the processing logic may store the architecture diagram in association with the deployment configuration. This may mean that the architecture diagram and its associated deployment configuration may be stored in such a manner that they each may be accessed by a user.

Figure 6:
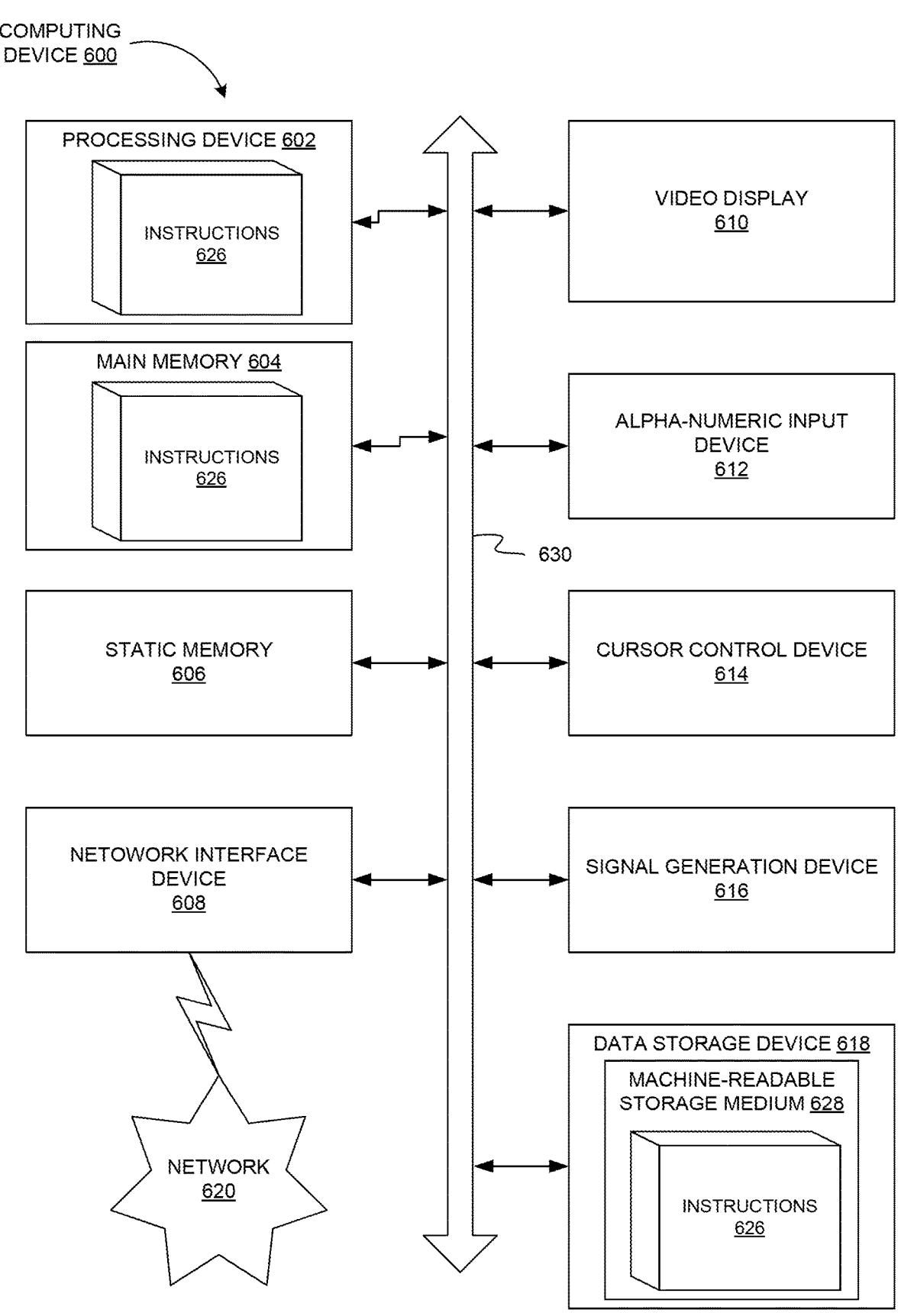
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein. In one embodiment, processing device 602 represents processing device 120 of FIG. 1. In another embodiment, processing device 602 represents a processing device of a client device (e.g., client devices 130-136 of FIG. 1).

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions, e.g., instructions for carrying out the operations described herein, in accordance with one or more aspects of the present disclosure. Diagram-to-deployment converter instructions 626 may also reside, completely or at least partially, within main memory 604 and/or within processing device 602 during execution thereof by computing device 600, main memory 604 and processing device 602 also constituting computer-readable media. The instructions may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "encoding," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:

receiving architecture instructions for a plurality of microservices from a microservice system, the architecture instructions comprising one or more design parameters for one or more of the plurality of microservices and an architecture diagram for the plurality of microservices, wherein the architecture diagram is a visual diagram indicating usage of the plurality of microservices and the one or more design parameters include a version of the architecture diagram, a programming language, and purposes of the plurality of microservices;

generating, by a processing device, in view of a machine learning model, a deployment configuration for the architecture instructions, wherein the deployment configuration comprises one or more deployment parameters generated by the machine learning model based on the one or more design parameters, wherein the one or more design parameters include more general information than the one or more deployment parameters;

receiving an update to the deployment configuration applied to the microservice system for a new version of the architecture diagram, the update associated with the one or more design parameters including the new version of the architecture diagram; and in response to receiving the update, modifying the architecture instructions into the new version of the architecture diagram and the visual diagram to reflect the update to the deployment configuration by updating the one or more deployment parameters based on the one or more design parameters for successfully deploying the plurality of microservices using the microservice system.

2. The method of claim 1, further comprising sending the modified architecture instructions to a client device of a user of the deployment configuration.

3. The method of claim 1, further comprising storing the modified architecture instructions in association with the deployment configuration.

4. The method of claim 1, wherein the machine learning model is trained on a plurality of past deployment configurations associated with information from a plurality of existing architecture diagrams.

5. The method of claim 1, wherein the update to the deployment configuration comprises at least one of an addition of a new microservice, an addition of a new programming language to the deployment configuration, a change in a size of a memory storage device, or a change to a number of input/output ports in one or more components.

6. The method of claim 1, wherein modifying the architecture instructions to reflect the update to the deployment configuration comprises adding one or more additional design parameters to the architecture instructions.

7. The method of claim 1, further comprising:

testing the deployment configuration to determine whether the update to the deployment configuration negatively affects a performance associated with one or more of the plurality of microservices;

determining that the update does negatively affect the performance associated with one or more of the plurality of microservices; and outputting an alert that the update negatively affects the performance associated with one or more of the plurality of microservices, wherein the alert comprises one or more suggested remedies to correct the performance associated with one or more of the plurality of microservices.

8. A system, comprising:

a memory to store one or more processing instructions;

a processing device, operatively coupled to the memory, to:

receive architecture instructions for a plurality of microservices from a microservice system, the architecture instructions comprising one or more design parameters for one or more of the plurality of microservices and an architecture diagram for the plurality of microservices, wherein the architecture diagram is a visual diagram indicating usage of the plurality of microservices and the one or more design parameters include a version of the architecture diagram, a programming language, and purposes of the plurality of microservices;

generate, in view of a machine learning model, a deployment configuration for the architecture instructions, wherein the deployment configuration comprises one or more deployment parameters generated by the machine learning model based on the one or more design parameters, wherein the one or more design parameters include more general information than the one or more deployment parameters;

receive an update to the deployment configuration applied to the microservice system for a new version of the architecture diagram, the update associated with the one or more design parameters including the new version of the architecture diagram; and in response to receiving the update, modify the architecture instructions into the new version of the architecture diagram and the visual diagram to reflect the update to the deployment configuration by updating the one or more deployment parameters based on the one or more design parameters for successfully deploying the plurality of microservices using the microservice system.

9. The system of claim 8, wherein the one or more processing devices are further programmed to send the modified architecture instructions to a client device to a user of the deployment configuration.

10. The system of claim 8, wherein the one or more processing devices are further programmed to store the modified architecture instructions in association with the deployment configuration.

11. The system of claim 8, wherein the machine learning model is trained on a plurality of past deployment configurations associated with information from a plurality of existing architecture diagrams.

12. The system of claim 8, wherein the update to the deployment configuration comprises an addition of a new microservice, an addition of a new programming language to the deployment configuration, a change in a size of a memory storage device, a change to a number of input/output ports in one or more components.

13. The system of claim 8, wherein modifying the architecture instructions to reflect the update to the deployment configuration comprises adding one or more additional design parameters to the architecture instructions.

14. The system of claim 8, wherein the one or more processing devices are further programmed to:

test the deployment configuration to determine whether the update to the deployment configuration negatively affects a performance associated with one or more of the plurality of microservices;

determine that the update does negatively affect the performance associated with one or more of the plurality of microservices; and output an alert that the update negatively affects the performance associated with one or more of the plurality of microservices, wherein the alert comprises one or more suggested remedies to correct the performance associated with one or more of the plurality of microservices.

15. A non-transitory computer readable storage medium having instructions stored thereon that, when executed by a processing device, cause the processing device to:

receive architecture instructions for a plurality of microservices from a microservice system, the architecture instructions comprising one or more design parameters for one or more of the plurality of microservices and an architecture diagram for the plurality of microservices, wherein the architecture diagram is a visual diagram indicating usage of the plurality of microservices and the one or more design parameters include a version of the architecture diagram, a programming language, and purposes of the plurality of microservices;

generate, by the processing device, in view of a machine learning model, a deployment configuration for the architecture instructions, wherein the deployment configuration comprises one or more deployment parameters generated by the machine learning model based on the one or more design parameters, wherein the one or more design parameters include more general information than the one or more deployment parameters;

receive an update to the deployment configuration applied to the microservice system for a new version of the architecture diagram, the update associated with the one or more design parameters including the new version of the architecture diagram; and in response to receiving the update, modify the architecture instructions into the new version of the architecture diagram and the visual diagram to reflect the update to the deployment configuration by updating the one or more deployment parameters based on the one or more design parameters for successfully deploying the plurality of microservices using the microservice system.

16. The non-transitory computer readable storage medium of claim 15, wherein the processing device is further pro-grammed to send the modified architecture instructions to a client device of a user of the deployment configuration.

17. The non-transitory computer readable storage medium of claim 15, wherein the processing device is further pro-grammed to store the modified architecture instructions in association with the deployment configuration.

18. The non-transitory computer readable storage medium of claim 15, wherein the machine learning model is trained on a plurality of past deployment configurations associated with information from a plurality of existing architecture diagrams.

19. The non-transitory computer readable storage medium of claim 15, wherein the update to the deployment configuration comprises an addition of a new microservice, an addition of a new programming language to the deployment configuration, a change in a size of a memory storage device, a change to a number of input/output ports in one or more components.

20. The non-transitory computer readable storage medium of claim 15, wherein modifying the architecture instructions to reflect the update to the deployment configuration comprises adding one or more additional design parameters to the architecture instructions.

* * * * *